(12) United States Patent
Watanabe

(10) Patent No.: US 12,351,242 B2
(45) Date of Patent: Jul. 8, 2025

(54) VEHICLE REAR PORTION STRUCTURE

(71) Applicant: HONDA MOTOR CO., LTD., Tokyo (JP)

(72) Inventor: Taichi Watanabe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 304 days.

(21) Appl. No.: 17/973,580

(22) Filed: Oct. 26, 2022

(65) Prior Publication Data
US 2023/0166797 A1   Jun. 1, 2023

(30) Foreign Application Priority Data
Nov. 30, 2021   (JP) .................................. 2021-194168

(51) Int. Cl.
*B62D 25/02*   (2006.01)
*B62D 25/08*   (2006.01)

(52) U.S. Cl.
CPC ........... *B62D 25/087* (2013.01); *B62D 25/02* (2013.01)

(58) Field of Classification Search
CPC ............................. B62D 25/087; B62D 25/08
USPC .......................................... 296/193.08, 37.1
See application file for complete search history.

(56) References Cited

U.S. PATENT DOCUMENTS

| | | | | |
|---|---|---|---|---|
| 3,661,419 A | * | 5/1972 | Mitamura ............ | B60K 15/063 280/834 |
| 2004/0066061 A1 | * | 4/2004 | Engels .................... | B60R 19/18 296/193.08 |
| 2007/0236049 A1 | * | 10/2007 | Chapman ............. | B62D 25/087 296/193.08 |
| 2012/0049557 A1 | * | 3/2012 | Sakai ..................... | B62D 25/02 296/24.4 |
| 2015/0239400 A1 | * | 8/2015 | Tanaka ................... | B62D 25/12 296/37.1 |
| 2016/0297481 A1 | * | 10/2016 | Yokoi .................... | B62D 27/02 |
| 2022/0242488 A1 | * | 8/2022 | Park ..................... | B62D 27/023 |

FOREIGN PATENT DOCUMENTS

JP   2021-000936   1/2021

* cited by examiner

*Primary Examiner* — Joseph D. Pape
(74) *Attorney, Agent, or Firm* — Amin, Turocy & Watson, LLP

(57) ABSTRACT

A rear panel extending in a vehicle width direction at a rear portion of a vehicle, and a rear in-panel extending in a vehicle front-rear direction on a vehicle width direction side surface of the rear portion of the vehicle are provided. The rear panel includes: a rear panel body extending in the vehicle width direction, and a front extension portion bent and extended from an outer side of the rear panel body in the vehicle width direction toward a front side. The front extension portion and the rear in-panel are connected to form a side surface of a luggage room.

4 Claims, 4 Drawing Sheets

VEHICLE REAR PORTION STRUCTURE

CROSS-REFERENCE TO RELATED APPLICATION

Priority is claimed on Japanese Patent Application No. 2021-194168, filed in Japan on Nov. 30, 2021, the entire content of which is incorporated herein by reference.

BACKGROUND OF THE INVENTION

Field of the Invention

The present invention relates to a vehicle rear portion structure.

Description of Related Art

A vehicle rear portion structure in which a luggage room (trunk room) is formed includes a rear panel extending in a vehicle width direction, an outer panel disposed on a side portion of the vehicle in the vehicle width direction, and a rear inner panel (rear inner panel) disposed on an inner side of the outer panel. The rear panel extends to abut the outer panel. The rear inner panel extends in a vehicle front-rear direction on an inner side of the outer panel in the vehicle width direction. The outer panel and the rear inner panel form a closed cross section.

Incidentally, in recent years, improvement of vehicle safety and convenience has been further demanded. Here, when the rear panel and the rear inner panel are provided separately, for example, when a load is applied to the rear panel at the time of rear collision or the like, the rear panel is likely to fall forward of the vehicle. In order to prevent such falling, a falling prevention member may be provided on the rear panel. (See, for example, Japanese Unexamined Patent Application, First Publication No. 2021-000936.)

SUMMARY OF THE INVENTION

However, in the above-described conventional art, there is a possibility that the falling prevention member becomes large depending on the size of the luggage room. That is, for example, in a case where the height of the luggage room is high, the height of the rear panel also increases accordingly, and thus, it is necessary to increase the height of the falling prevention member in order to prevent the falling of the rear panel. Therefore, there is a problem that, when an attempt is made to improve the safety of the vehicle, the space of the luggage room is restricted, and the convenience of the vehicle is impaired. There is a problem that the manufacturing cost of the vehicle is also increased.

An aspect according to the present invention has been made in view of such circumstances, and an object is to provide a vehicle rear portion structure capable of increasing a degree of freedom in designing a luggage room, securing as large a space of the luggage room as possible, and reducing the manufacturing cost while improving safety and convenience of the vehicle.

In order to solve the above problems and achieve the object, the present invention adopts the aspects described below.

(1) A vehicle rear portion structure according to an aspect of the present invention includes: a rear panel that extends in a vehicle width direction at a rear portion of a vehicle; and a rear in-panel that extends in a vehicle front-rear direction on a vehicle width direction side surface of the rear portion of the vehicle, in which the rear panel includes: a rear panel body extending in the vehicle width direction, and a front extension portion bent and extended from an outer side of the rear panel body in the vehicle width direction toward a front side in the vehicle front-rear direction, and the front extension portion and the rear in-panel are connected to form a vehicle width direction side surface of a vehicle rear portion luggage room.

With such a constitution, for example, when a load is applied to the rear panel at the time of rear collision, the load can be received by the rear in-panel via the front extension portion. In this way, the rigidity of the vehicle rear portion structure can be improved, and it is not necessary to provide the falling prevention member for preventing the falling of the rear panel. A weld nut and bolt for disposing an electronic device such as audio can be formed on the vehicle width direction side surface, and the welding nut and bolt can also be formed on the rear panel without using a dedicated panel member or the rear in-panel. Therefore, it is possible to increase a degree of freedom in designing the luggage room and secure as large a space of the luggage room as possible while improving safety and convenience of the vehicle. The manufacturing cost of the vehicle rear portion structure can also be reduced.

(2) In the above aspect (1), the rear in-panel may include: a rear in-panel body extending in the vehicle front-rear direction, and a rear extension portion extending rearward in the vehicle front-rear direction from the rear in-panel body, and the front extension portion and the rear extension portion may be connected to form the vehicle width direction side surface of the vehicle rear portion luggage room.

As described above, since the extension portions are formed on both the rear panel and the rear in-panel, it is possible to eliminate the problem that one of the extension portions is easily broken. It is possible to provide the vehicle rear portion structure having higher rigidity by adjusting the lengths of the extension portions.

(3) In the above aspect (2), the rear extension portion may be formed below the center of the rear in-panel in the up-down direction.

With such a constitution, it is possible to prevent the rear panel from falling without wastefully increasing the connection portions between the rear panel and the rear in-panel. Therefore, the rigidity of the vehicle rear portion structure can be efficiently increased.

(4) In the above aspect (1), the rear panel and the rear in-panel may be connected to each other on the lower side of the center in the up-down direction.

With such a constitution, it is possible to prevent the rear panel from falling without wastefully increasing the connection portions between the rear panel and the rear in-panel. Therefore, the rigidity of the vehicle rear portion structure can be efficiently increased.

(5) In the above aspect (1), at a corner portion, of a peripheral frame, at a side portion in the vehicle width direction, the peripheral frame forming a luggage room opening communicating a luggage room and rear outside of the vehicle, at least one panel of a plurality of panels overlapping one another and forming the peripheral frame may have a cutout portion formed in an outer peripheral edge portion overlapping another one of the panels.

The rigidity of the vehicle rear portion structure is increased by connecting the rear panel and the rear in-panel. Therefore, the rigidity of the vehicle rear portion structure can be sufficiently secured even when the cutout portion is formed in at least one of the plurality of panels at the corner portion of the peripheral frame.

Here, at the corner portion of the peripheral frame, the panels have a large number of steps and are complicated, and there is a possibility that distortion occurs when the plurality of panels are overlapped. However, by forming the cutout portion in at least one panel of the plurality of panels, the number of overlapping panels can be reduced at the portion where the cutout portion is formed. As a result, it is possible to suppress distortion at the time of welding the panels or at the time of overlapping the panels, and to sufficiently secure rigidity of the vehicle rear portion structure.

According to an aspect according to the present invention, in a vehicle rear portion structure, it is possible to increase a degree of freedom in designing a luggage room and secure as large a space of the luggage room as possible while improving safety and convenience of the vehicle. The manufacturing cost of the vehicle rear portion structure can also be reduced.

DETAILED DESCRIPTION OF THE INVENTION

Next, an embodiment of the present invention will be described on the basis of the drawings.

In the description described below, a front side of a vehicle 100 in a traveling direction is simply referred to as a front side, a rear side of the vehicle 100 in the traveling direction is simply referred to as a rear side, vertical up-down directions are referred to as an upper side and a lower side, respectively, and a vehicle width direction of the vehicle 100 is referred to as a vehicle width direction or a left-right direction. An arrow FR pointing to the front side of the vehicle 100, an arrow UP pointing to the upper side of the vehicle 100, and an arrow LH pointing to a left lateral side of the vehicle in the vehicle width direction are given at appropriate positions in each of the drawings to be described below. In the description described below, join means joining by spot welding or the like.

<Rear Portion Structure of Vehicle>

Figure 1:
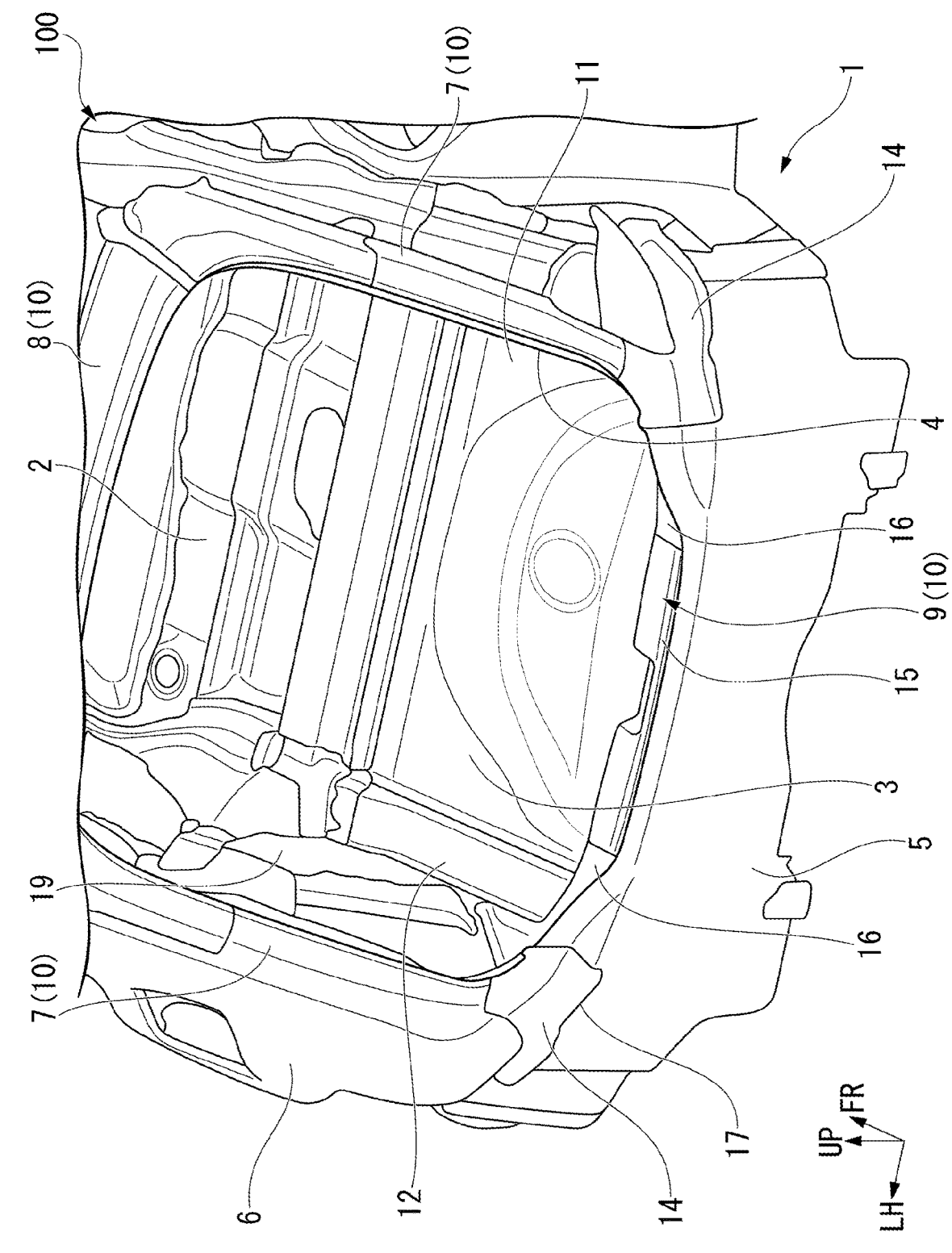
FIG. 1 is a perspective view of a vehicle rear portion structure in an embodiment of the present invention as viewed obliquely from above and behind.

FIG. 1 is a perspective view of a rear portion structure 1 of the vehicle 100 (hereinafter, referred to as a vehicle rear portion structure 1) as viewed obliquely from above and behind. The vehicle rear portion structure 1 is formed symmetrically. In the description described below, the left side of the vehicle rear portion structure 1 will be mainly described. Description of the right side of the vehicle rear portion structure 1 will be omitted.

As illustrated in FIG. 1, the vehicle rear portion structure 1 mainly includes a luggage room 3 provided on a rear side of a passenger room (cabin) 2, a luggage room opening 4 that communicates the luggage room 3 with the rear outside of the vehicle 100, a rear outer panel 5 provided behind and below the luggage room opening 4, and outer panels 6 provided on both left and right sides of the luggage room opening 4.

The luggage room opening 4 can be opened and closed by a tailgate, which is not illustrated. The vehicle 100 is a so-called hatchback type vehicle to which a tailgate is attached so as to be able to swing upward and rotate. The luggage room opening 4 includes, as a peripheral frame 10 forming the luggage room opening 4, pillar gutters 7 disposed on the left and right sides, a roof cross member 8 coupling upper end portions of the left and right pillar gutters 7 to each other, and a rear panel cross member 9 coupling lower end portions of the left and right pillar gutters 7 to each other.

The pillar gutter 7 is formed so as to extend obliquely downward from an upper end of the luggage room opening 4 toward the rear side and then curve slightly toward the center in the vehicle width direction at the lower end portion of the luggage room opening 4. The outer panels 6 are disposed on outer sides of the pillar gutters 7 in the vehicle width direction. The rear outer panel 5, the roof cross member 8, and the rear panel cross member 9 extend in the vehicle width direction. The rear panel cross member 9 includes a cross member body 15 extending in the vehicle width direction at a major part of the center in the vehicle width direction, and a pair of coupling frames 16 extending outward in the vehicle width direction from both ends of the cross member body 15 in the vehicle width direction.

A weatherstrip, which is not illustrated, is attached to the peripheral frame 10 over the entire circumference. When the tailgate, which is not illustrated, is closed, the weatherstrip seals between the luggage room opening 4 and the tailgate (the inside and the outside of the vehicle interior) in a watertight manner. A seal flange for attaching the weatherstrip is provided on the peripheral frame 10 over the entire circumference.

The roof cross member 8 and the pillar gutters 7 of the peripheral frame 10 are provided with a drip portion, which is not illustrated. The drip portion is located on an outer peripheral side (the outer side of the vehicle) of the luggage room opening 4 with respect to the seal flange and the weatherstrip. The drip portion guides rainwater or the like that has entered the inside of the vehicle from the outer panels 6 through a gap on the outer periphery of the tailgate (not illustrated either) to a predetermined drain passage.

At lower ends of the pillar gutters 7, tail lamp base plates 14 are provided from the rear side. The tail lamp base plates 14 extend in the vehicle width direction across the rear outer panel 5 and the outer panels 6. The tail lamp base plates 14 are formed in a recessed shape (L-shape in cross section in the front-rear direction) with the rear side opened. A tail lamp, which is not illustrated, is disposed and fixed to the tail lamp base plate 14 from the outside.

Figure 2:
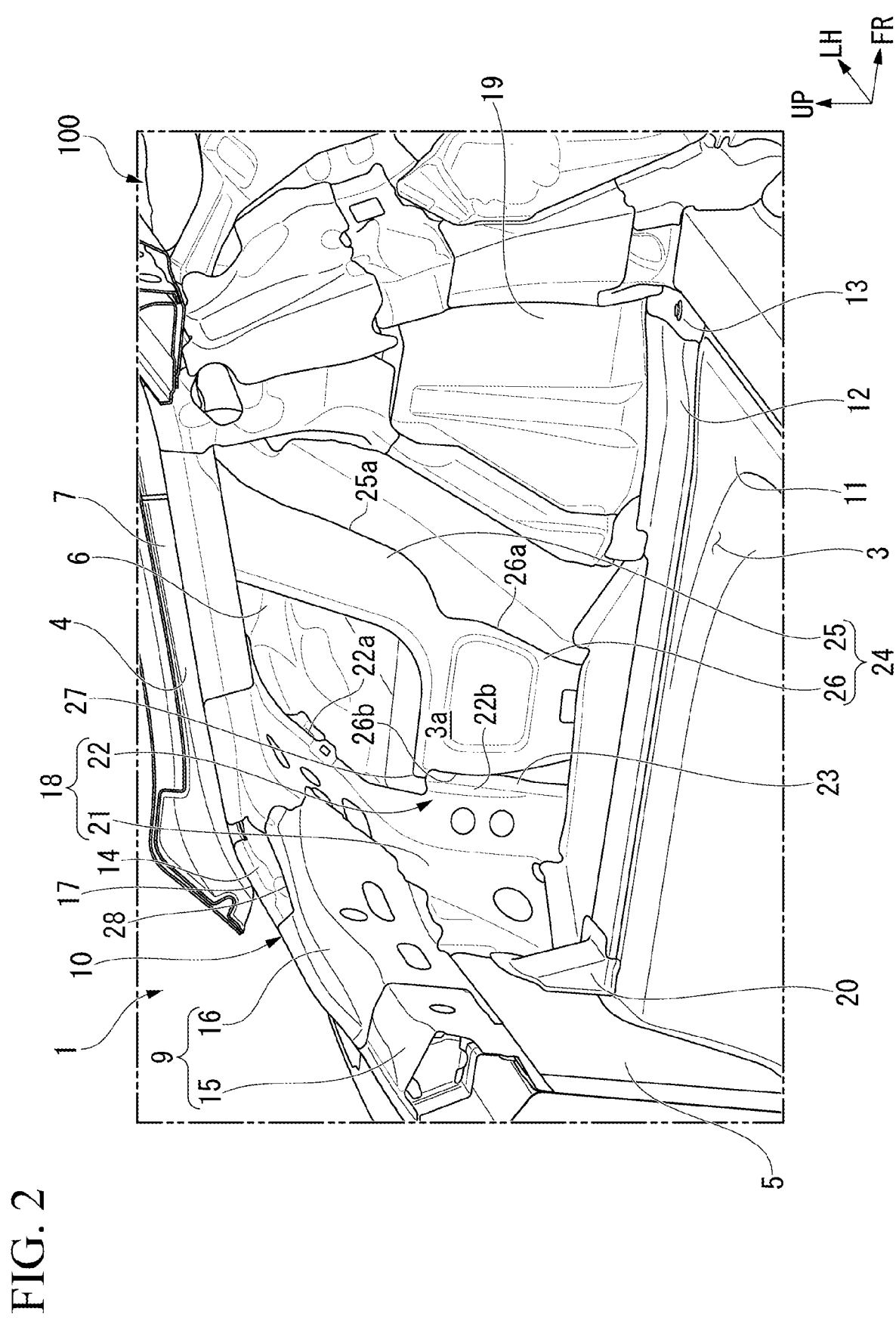
FIG. 2 is a view taken along arrow II in FIG. 1.

FIG. 2 is a view taken along arrow II in FIG. 1.

As illustrated in FIGS. 1 and 2, the rear panel cross member 9 is joined to a front side surface of the rear outer panel 5, and a closed cross section extending in the vehicle width direction is formed. Furthermore, on the front side surface of the rear outer panel 5, rear ends of a pair of rear side frames 12 are joined to the left and right sides. The rear side frames 12 extend in the front-rear direction. Front ends of the rear side frames 12 are joined to side sills 13.

Between upper surfaces at the rear ends of the rear side frames 12 and the front side surface of the rear outer panel 5, falling prevention portions 20 extending over the upper surfaces and the front side surface are provided. The width of the falling prevention portion 20 in the vehicle width direction is substantially the same as the width of the rear side frame 12 in the vehicle width direction. An upper end of the falling prevention portion 20 is positioned below the center of the rear outer panel 5 in the up-down direction. A closed cross section is formed by the falling prevention portions 20, the rear side frames 12, and the rear outer panel 5. The falling prevention portion 20 is to suppress the rear outer panel 5 from falling forward, for example, when a load is applied to the rear outer panel 5 at the time of rear collision or the like.

A rear end of a rear floor panel 11 of the luggage room 3 is joined to the front side surface of the rear outer panel 5. The rear floor panel 11 extends in the vehicle width direction and the front-rear direction across the left and right rear side frames 12.

As illustrated in FIG. 2, a rear panel 18 is provided at a corner portion 17, which is a connection portion between the rear outer panel 5 and the outer panel 6, on the luggage room 3 side of the rear outer panel 5 and the outer panel 6. The rear panel 18 has a rear panel body 21 formed in a rectangular shape that is long in the up-down direction as viewed from the front. That is, the rear panel body 21 extends in the up-down direction across the rear side of the pillar gutter 7 and the rear side frame 12, and extends in the vehicle width direction. A major part of the rear panel body 21 is disposed on the outer side of the rear outer panel 5 in the vehicle width direction and on the front side surface.

A front extension portion 22 bent and extending forward is formed on the outer side of the rear panel body 21 in the vehicle width direction. The front extension portion 22 is disposed behind the outer panel 6 and on a side surface on the luggage room 3 side. The front extension portion 22 is formed such that length of extension to the front side becomes longer toward the lower side above the center in the up-down direction.

On the lower side of the center of the front extension portion 22 in the up-down direction, the length of extension to the front side is substantially the same over the entire up-down direction. An upper front side 22a and a lower front side 22b of the front extension portion 22 are smoothly continuous. A joining flange 23 extending to the front side is formed on the lower front side 22b. The joining flange 23 is to join the rear panel 18 and a rear in-panel 24 described below.

The rear in-panel 24 is provided between the rear panel 18 and a rear wheel house inner 19 on a side surface of the outer panel 6 on the luggage room 3 side. The rear in-panel 24 is formed across the center of the pillar gutter 7 in the front-rear direction and the rear side frame 12. More specifically, the rear in-panel 24 is formed by integrally molding a rear in-panel body 25 disposed above the center of the rear in-panel 24 in the up-down direction and a rear extension portion 26 disposed below the center of the rear in-panel 24 in the up-down direction.

The rear in-panel body 25 is formed in a rectangular shape that is long in the up-down direction as viewed from the luggage room 3 side. The rear in-panel body 25 extends slightly obliquely so as to extend rearward toward the lower side. The rear in-panel body 25 extends in the up-down direction between the center of the pillar gutter 7 in the front-rear direction and the center of the rear in-panel 24 in the up-down direction, and extends in the front-rear direction.

The rear extension portion 26 extends rearward from a lower end of the rear in-panel body 25 (the center of the rear in-panel 24 in the up-down direction). The rear extension portion 26 is formed in a substantially square shape as viewed from the luggage room 3 side. A front side 26a of the rear extension portion 26 and a front side 25a of the rear in-panel body 25 are smoothly continuous.

A joining flange 27 extending to the rear side is formed on a rear side 26b of the rear extension portion 26. The joining flange 27 and the joining flange 23 of the front extension portion 22 are overlapped and joined. These joining flanges 23 and 27 are joined, and a vehicle width direction side surface (an example of a vehicle width direction side surface of a vehicle rear portion luggage room in the claims 3a of the luggage room 3 is formed by the rear panel 18 and the rear in-panel 24.

An outlet opening, which is not illustrated, is formed in the outer panel 6 so as to correspond to the place where the joining flanges 23 and 27 overlap. This outlet opening is to release a rapidly rising pressure in the luggage room 3, for example, when the tailgate is closed. The joining flanges 23 and 27 are joined through the outlet opening.

Here, within the rear panel cross member 9 constituting the peripheral frame 10, an outer end of the coupling frame 16 in the vehicle width direction disposed at the corner portion 17 is joined to an upper portion of the rear panel body 21. A cutout portion 28 is formed on an outer side in the vehicle width direction (rear panel body 21) of the upper portion of the outer peripheral edge of the coupling frame 16. In other words, the cutout portion 28 is formed to be long in the vehicle width direction between the center of the coupling frame 16 in the vehicle width direction and an outer end in the vehicle width direction. When viewed from the luggage room 3 side, an outer peripheral edge portion of the tail lamp base plate 14 is exposed through the cutout portion 28.

As described above, at the cutout portion 28, only the tail lamp base plate 14 and the rear outer panel 5 overlap with each other, and the coupling frame 16 does not overlap with this area. As a result, when the rear outer panel 5, the tail lamp base plate 14, and the coupling frame 16 are joined, the three joint portions do not overlap. Hereinafter, the joining of the rear outer panel 5, the rear panel cross member 9 (cross member body 15, coupling frame 16), the rear panel 18, and the tail lamp base plate 14 will be described with reference to the drawings.

<Joining of Panels in Vehicle Rear Portion Structure>

Figure 3:
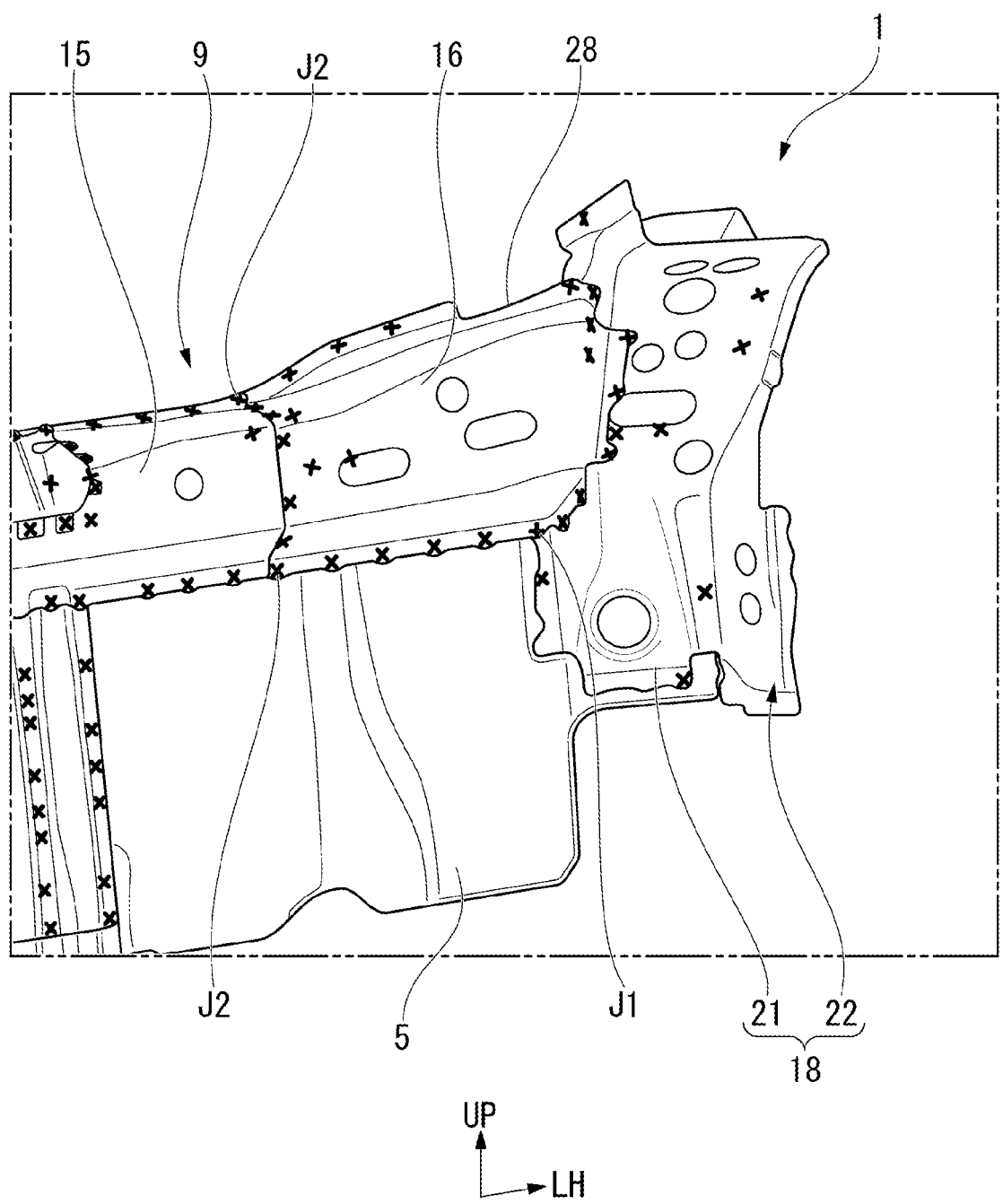
FIG. 3 is a perspective view of a joint portion between a rear panel and a coupling frame of the embodiment of the present invention as viewed from the front.
Figure 4:
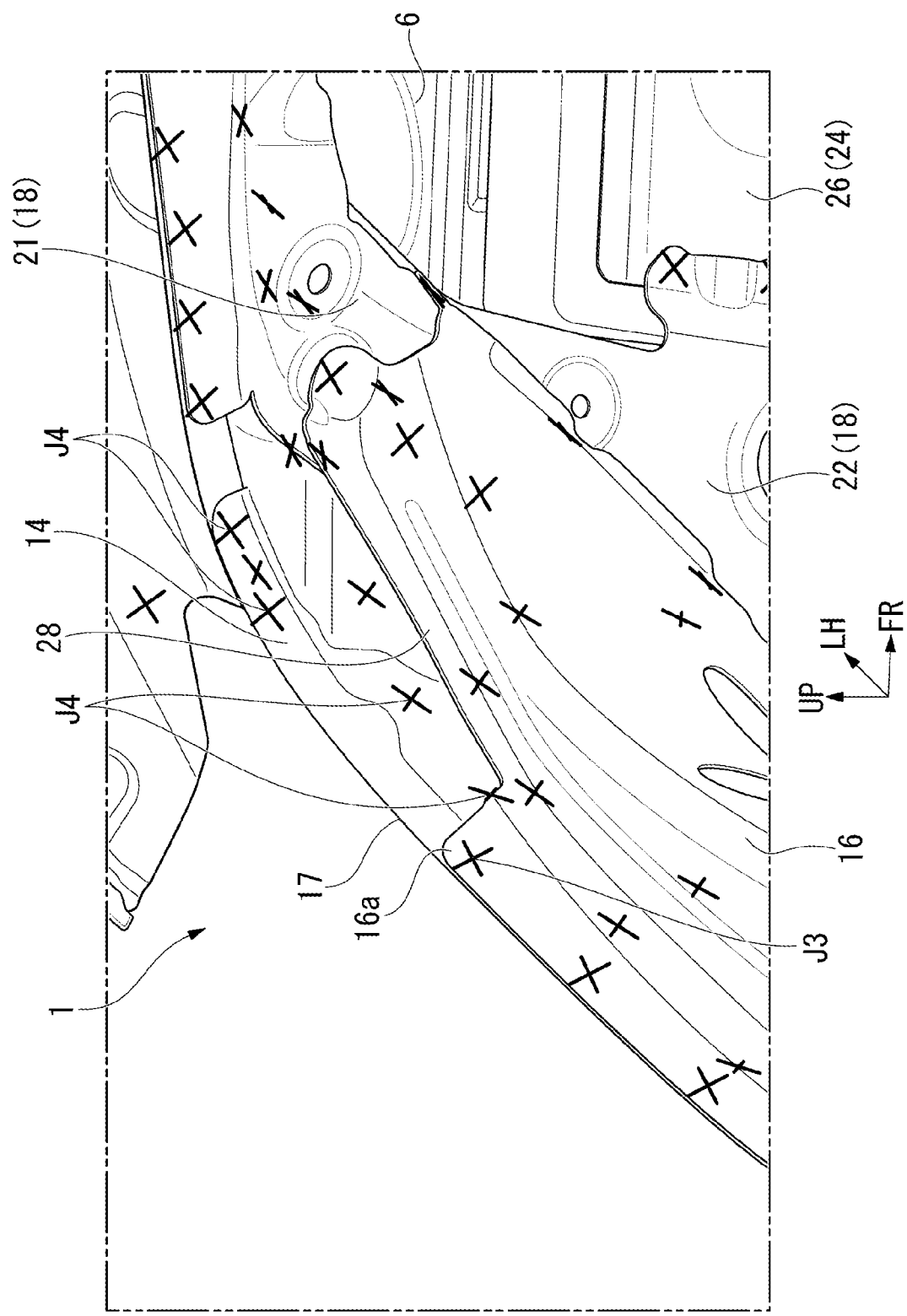
FIG. 4 is an enlarged perspective view of a cutout portion of a coupling frame of the embodiment of the present invention.

FIG. 3 is a perspective view of a joint portion between the rear panel 18 and the coupling frame 16 as viewed from the front. FIG. 4 is an enlarged perspective view of the cutout portion 28 of the coupling frame 16. In FIGS. 3 and 4, the joining is spot welding, and the weld portions are indicated by cross marks.

As illustrated in FIG. 3, first, the rear outer panel 5, the rear panel cross member 9, and the rear panel 18 are joined.

At this time, on an outer side of the coupling frame 16 in the vehicle width direction, the three panels of the outer panel 6, the rear panel body 21, and the coupling frame 16 are overlapped and joined at a weld portion J1 of the respective corner portions of the lower ends.

On an inner side of the coupling frame 16 in the vehicle width direction, the three panels of the outer panel 6, the cross member body 15, and the coupling frame 16 are overlapped and joined at a weld portion J2 of the respective corner portions of the upper and lower ends.

The two panels of the rear panel cross member 9 and the rear panel 18 are overlapped and joined to the rear outer panel 5 for portions other than the weld portions J1 and J2 where the above three panels are overlapped and joined. In this manner, the rear outer panel 5, the rear panel cross member 9, and the rear panel 18 are joined.

Next, as illustrated in FIG. 4, the tail lamp base plate 14 is joined from the rear side of the rear outer panel 5. At this time, at an upper end of the coupling frame 16, at a weld portion J3 at a corner portion 16a on the inner side in the vehicle width direction with respect to the cutout portion 28, the three panels of the rear outer panel 5, the coupling frame 16, and the tail lamp base plate 14 are overlapped and joined.

On the other hand, at weld portions J4 where the cutout portion 28 is formed, the two panels of the rear outer panel 5 and the tail lamp base plate 14 are overlapped and joined. These weld portions J4 are portions where the three panels of the rear outer panel 5, the coupling frame 16, and the tail lamp base plate 14 overlap one another when the cutout portion 28 is absent. A portion corresponding to the cutout portion 28 is a position overlapping the corner portion 17 of the vehicle 100. At such a position, the shapes of the rear outer panel 5 and the outer panel 6 are complicated with many steps. At such a position, by forming the cutout portion 28, the two panels of the rear outer panel 5 and the tail lamp base plate 14 are overlapped.

<Operation of Rear Panel and Rear In-Panel>

Next, operations of the rear panel 18 and the rear in-panel 24 will be described.

For example, when a load is applied to the rear panel 18 via the rear outer panel 5 at the time of rear collision, the rear panel 18 tends to fall forward. Here, as illustrated in FIG. 2, the front extension portion 22 is formed on the rear panel 18. The rear extension portion 26 is formed on the rear in-panel 24 disposed in front of the rear panel 18. Then, the front extension portion 22 and the rear extension portion 26 are joined. Therefore, the rear panel 18 is propped up by the rear in-panel 24, and falling of the rear panel 18 to the front side is suppressed.

In particular, at the time of rear collision, first, a load is often applied to the rear outer panel 5 via a bumper, which is not illustrated, and thus a load is likely to be applied to the lower side of the rear panel 18. The front extension portion 22 is formed on the lower side of the rear panel 18, and the rear extension portion 26 is formed on the lower side of the rear in-panel 24. Therefore, a load applied to the rear panel 18 at the time of rear collision is linearly transmitted to the rear in-panel 24 provided on the front side. The rear panel 18 receiving the load at the time of rear collision is unfailingly propped up by the rear in-panel 24, and falling of the rear panel 18 to the front side is unfailingly suppressed.

The load applied to the rear panel 18 is received by the rear in-panel 24 via the front extension portion 22. The rear in-panel 24 is joined to the outer panels 6, the pillar gutters 7, and the rear side frames 12. Therefore, the load received by the rear in-panel 24 is also received by the outer panels 6, the pillar gutters 7, and the rear side frames 12. As a result, for example, falling of the rear panel 18 to the front side at the time of rear collision is more unfailingly suppressed.

The extension portions 22 and 26 are formed on the rear panel 18 and the rear in-panel 24, respectively. Therefore, when the rear panel 18 and the rear in-panel 24 are joined, the length of any one of the extension portions 22 and 26 in the front-rear direction will not be increased. Thus, there is no problem such as easy breakage of any one of the extension portions 22 and 26.

As described above, the vehicle rear portion structure 1 described above includes the rear panel 18 and the rear in-panel 24. The rear panel 18 includes the rear panel body 21 extending in the vehicle width direction and the front extension portion 22 bent and extending forward from an outer side of the rear panel body 21 in the vehicle width direction. The front extension portion 22 and the rear in-panel 24 are joined to each other, and the rear panel 18 and the rear in-panel 24 form a vehicle width direction side surface 3a of the luggage room 3.

Therefore, for example, when a load is applied to the rear panel 18 at the time of rear collision, the load can be received by the rear in-panel 24 via the front extension portion 22. As described above, the rigidity of the vehicle rear portion structure 1 can be improved, and it is not necessary to increase the size of the falling prevention portion 20 for preventing the falling of the rear panel 18. A weld nut and bolt for disposing an electronic device such as audio can be formed on the vehicle width direction side surface, and the welding nut and bolt can also be formed on the rear panel 18 without using a dedicated panel member or the rear in-panel 24. Thus, it is possible to increase a degree of freedom in designing the luggage room 3 and secure as large a space of the luggage room 3 as possible while improving safety and convenience of the vehicle 100. The manufacturing cost of the vehicle rear portion structure 1 can also be reduced.

The rear in-panel 24 includes the rear in-panel body 25 extending in the vehicle front-rear direction and the rear extension portion 26 extending rearward from the rear in-panel body 25. The rear extension portion 26 and the front extension portion 22 of the rear panel 18 are joined to form the vehicle width direction side surface 3a of the luggage room 3. In this manner, the extension portions 26 and 22 are formed on both the rear panel 18 and the rear in-panel 24. Therefore, it is possible to eliminate the problem that any one of the extension portions 26 and 22 is easily broken. It is possible to provide the vehicle rear portion structure 1 having higher rigidity by adjusting the lengths of the extension portions 26 and 22.

The rear extension portion 26 is formed below the center of the rear in-panel 24 in the up-down direction. That is, the rear in-panel and the rear panel 18 are connected to each other on the lower side of the center in the up-down direction. In this manner, it is possible to prevent the rear panel 18 from falling without wastefully increasing the joint portions between the rear panel 18 and the rear in-panel 24. Therefore, the rigidity of the vehicle rear portion structure 1 can be efficiently increased, and the falling of the rear panel 18 can be prevented. The load applied to the rear panel 18 at the time of rear collision can be efficiently transmitted to the rear in-panel 24.

At the corner portion 17 on the side portion in the vehicle width direction, the cutout portion 28 is formed in the coupling frame 16 of the peripheral frame 10 forming the luggage room opening 4. The rigidity of the vehicle rear portion structure 1 is increased by connecting the rear panel 18 and the rear in-panel 24. Therefore, even when the cutout portion 28 is formed in the coupling frame 16, the rigidity of the vehicle rear portion structure 1 can be sufficiently secured.

Here, the corner portion 17 of the peripheral frame 10 is complicated due to a large number of steps of the rear outer panel 5, the rear panel 18, the rear in-panel 24, and the tail lamp base plate 14. Therefore, it is difficult to overlap the panels. However, by forming the cutout portion 28 in the coupling frame 16, the number of overlapping panels can be reduced at the portion where the cutout portion 28 is formed. As a result, the work of joining the rear outer panel 5, the rear panel 18, the rear in-panel 24, and the tail lamp base plate 14 at the corner portion 17 can be facilitated. Distortion when the rear outer panel 5, the rear panel 18, the rear in-panel 24, and the tail lamp base plate 14 are overlapped one another can be suppressed, and the rigidity of the vehicle rear portion structure 1 can be sufficiently secured.

The present invention is not limited to the above-described embodiment, and includes various modifications to the above-described embodiment without departing from the gist of the present invention.

For example, in the embodiment described above, the case where the cutout portion 28 is formed in the coupling frame 16 of the peripheral frame 10 forming the luggage room opening 4 has been described. However, it is not limited to this, and it is sufficient if the cutout portion 28 is formed in an outer peripheral edge portion of at least one panel overlapping another panel among the panels overlapping each other at the corner portion 17 among the panels constituting the peripheral frame 10. For example, the cutout portion 28 may be formed on the outer peripheral edge portion of the rear outer panel 5 or the tail lamp base plate 14.

In the above-described embodiment, the case where the front extension portion 22 is formed on the rear panel 18 and the rear extension portion 26 is formed on the rear in-panel 24 has been described. Then, the case where the extension portions 22 and 26 are joined and the vehicle width direction side surface 3a of the luggage room 3 is formed by the rear panel 18 and the rear in-panel 24 has been described. However, it is not limited thereto, and it is sufficient if the front extension portion 22 is formed at least on the rear panel 18 and the front extension portion 22 and the rear in-panel 24 are connected to form the vehicle width direction side surface 3a of the luggage room 3.

The corresponding extension portions 22 and 26 of the panels 18 and 24 may be formed over the entire up-down direction not only below the center in the up-down direction. Each of the panels 18 and 24 may be joined over the entire up-down direction.

What is claimed is:

1. A vehicle rear portion structure comprising:
   a rear panel that extends in a vehicle width direction at a rear portion of a vehicle; and
   a rear in-panel that extends in a vehicle front-rear direction on a vehicle width direction side surface of the rear portion of the vehicle, wherein
   the rear panel includes
   a rear panel body extending in the vehicle width direction, and
   a front extension portion bent and extended from an outer side of the rear panel body in the vehicle width direction toward a front side in the vehicle front-rear direction, and
   the front extension portion and the rear in-panel are connected to form a vehicle width direction side surface of a vehicle rear portion luggage room, wherein
   the rear in-panel includes
   a rear in-panel body extending in the vehicle front-rear direction, and
   a rear extension portion extending rearward in the vehicle front-rear direction from the rear in-panel body, and
   the front extension portion and the rear extension portion are connected to form the vehicle width direction side surface of the vehicle rear portion luggage room.

2. The vehicle rear portion structure according to claim 1, wherein
   the rear extension portion is formed below a center of the rear in-panel in an up-down direction.

3. The vehicle rear portion structure according to claim 1, wherein
   the rear panel and the rear in-panel are connected to each other on the lower side of the center in the up-down direction.

4. The vehicle rear portion structure according to claim 1, wherein
   at a corner portion, of a peripheral frame, at a side portion in the vehicle width direction, the peripheral frame forming a luggage room opening communicating a luggage room and rear outside of the vehicle, at least one panel of a plurality of panels overlapping one another and forming the peripheral frame has a cutout portion formed in an outer peripheral edge portion overlapping another one of the panels.

* * * * *